United States Patent
Epplin et al.

(10) Patent No.: US 8,641,337 B2
(45) Date of Patent: Feb. 4, 2014

(54) METHOD OF FORMING PARTS ON A CNC MACHINE

(75) Inventors: Lawrence Epplin, Dale, IN (US); Nicolas Vote, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 727 days.

(21) Appl. No.: 12/880,459

(22) Filed: Sep. 13, 2010

(65) Prior Publication Data

US 2012/0063862 A1    Mar. 15, 2012

(51) Int. Cl.
*B23C 1/06*    (2006.01)

(52) U.S. Cl.
USPC .............. 409/132; 409/80; 409/195; 700/171

(58) Field of Classification Search
USPC ............. 409/79, 80, 131, 132, 186, 188, 189, 409/193, 195, 202; 700/167, 171, 183, 184
See application file for complete search history.

(56) References Cited

U.S. PATENT DOCUMENTS

| | | | |
|---|---|---|---|
| 2,454,992 A * | 11/1948 | Coleman | 144/24.05 |
| 4,920,495 A * | 4/1990 | Pilkington | 700/195 |
| 4,949,270 A * | 8/1990 | Shima et al. | 700/184 |
| 5,141,212 A * | 8/1992 | Beeding | 269/21 |
| 5,375,951 A * | 12/1994 | Veale | 409/131 |
| 5,487,629 A * | 1/1996 | Watanabe | 409/137 |
| 5,953,232 A * | 9/1999 | Blaimschein | 700/171 |
| 6,580,963 B2 * | 6/2003 | Susnjara | 700/171 |
| 6,830,416 B2 * | 12/2004 | Susnjara et al. | 409/132 |
| 7,035,707 B2 * | 4/2006 | Susnjara et al. | 700/159 |

* cited by examiner

*Primary Examiner* — Daniel Howell
*Assistant Examiner* — Michael Vitale
(74) *Attorney, Agent, or Firm* — Novak Druce Connolly Bove + Quigg LLP

(57) ABSTRACT

A method of forming a part from a workpiece mountable on a porous spoil-board on the worktable of a CNC machine having means for applying a negative pressure on the underside of the workpiece, providing a pressure differential across the mounted workpiece, and a cutting tool displaceable along x, y and z axes, including programming the controller of the machine to generate a cutting pattern, computing the area of the part, comparing the computed area value of the part with a predetermined area value and positioning the cutting tool along the Z-axis to provide less than a through cut of the workpiece where the computed area value is less than the predetermined area value and providing a through cut when a computed area value exceeds the predetermined area value, mounting the workpiece on the worktable, actuating the negative pressure applying means and operating the machine to execute such program.

16 Claims, 4 Drawing Sheets

METHOD OF FORMING PARTS ON A CNC MACHINE

BACKGROUND OF THE INVENTION

In the field of computer numeric controlled (CNC) routing machines, it is common practice to utilize a vacuum hold-down system as a means of clamping a workpiece to a worktable. The successful utilization of a universal vacuum hold-down system for processing parts from sheet material, such as plywood and the like, is dependent upon the use of a spoil board with a smooth, high quality surface. This smooth surface enhances the hold down capability of the vacuum. However, as parts are cut, a portion of the spoil board material is removed to a slight depth, due to the necessity to cut deeper than the thickness of the sheet material, to ensure a complete severing of the part from the material sheet. This removal of spoil board material results in an increasing number of grooves being cut into its surface. The grooved surface results in a loss of vacuum under the part, since the grooved area is no longer in contact with the part, and therefore does not contribute to holding the part. The totality of the area of the grooves determines the overall spoil board surface quality. As degradation of the spoil board increases through continued grooving, the effectiveness of the vacuum hold-down system decreases. A condition such as this will ultimately result in some parts moving during the cutting process, or in some cases, one or more parts may actually be ejected from the table. Parts that move during the cutting process must be discarded, as the shape of such parts will be understandably distorted. Additionally, there is inherent danger associated with the unexpected ejection of a workpiece from the spoil board.

SUMMARY OF THE INVENTION

The present invention serves to overcome the shortfalls of prior art through the use of a software algorithm to calculate the extent of the aforementioned grooves, quantitatively evaluate the quality of the spoil board surface based on the aforementioned calculation, and to alert the operator to the deteriorating surface quality of a spoil board.

Accordingly, the principal object of the present invention is to provide a method for monitoring the condition of a spoil board on a CNC machine.

Another object of the present invention is to negate the hazards associated with unexpected ejection of one or more work pieces from a CNC machine worktable.

A still further abject of the present invention is to reduce the number of defective parts produced on a CNC machine, resulting from inadequate workpiece clamping.

DETAILED DESCRIPTION OF THE PREFERRED EMBODIMENT OF THE INVENTION

Figure 1:
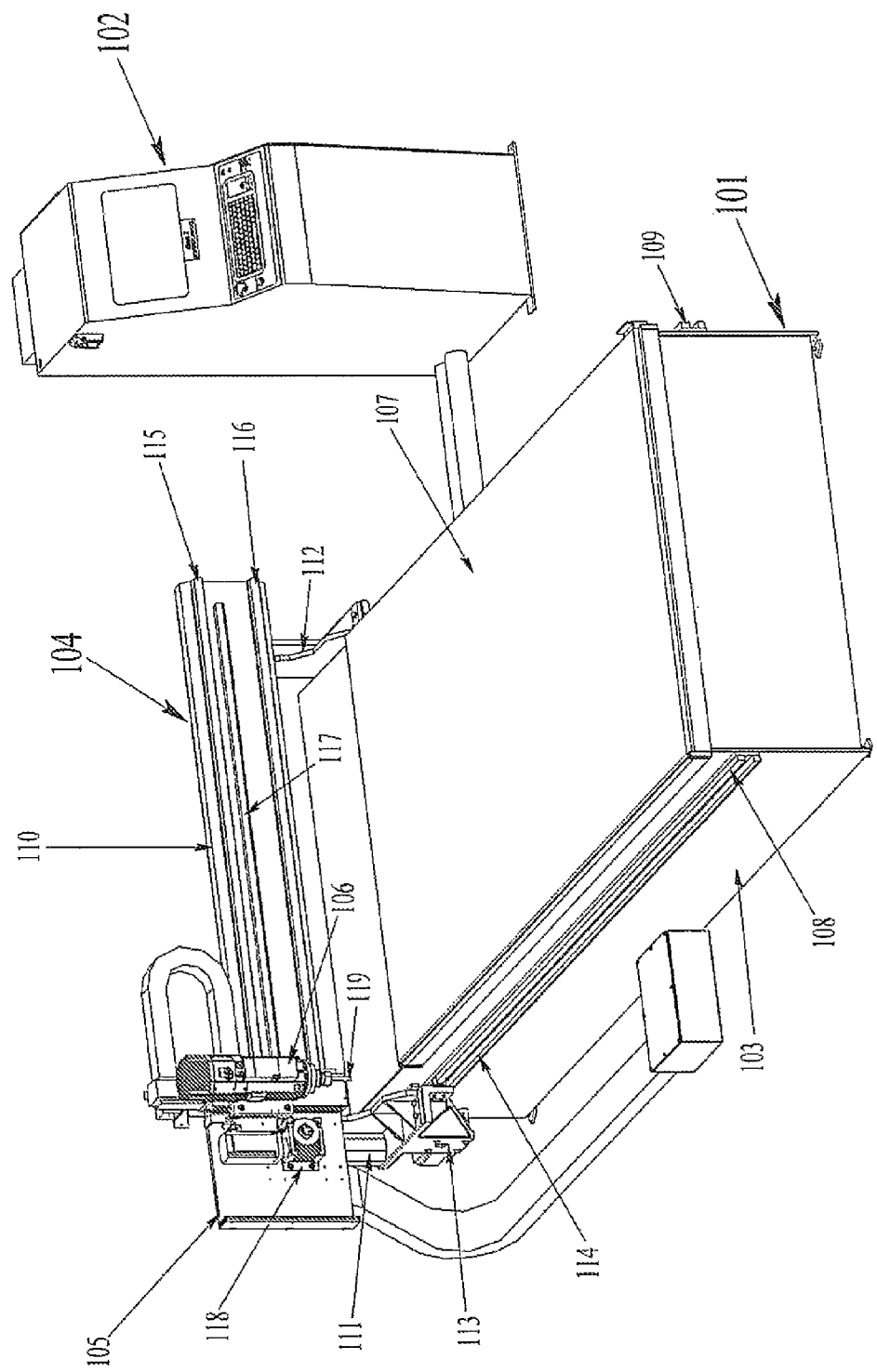
FIG. 1 is a perspective view of a CNC machine.

Referring to FIG. 1, there is illustrated, a computer numeric controlled (CNC) routing machine 101. A controller 102 is operatively connected to the machine for displacing a tool-head support assembly 105 along a longitudinal line of travel or an x-axis, a transverse line of travel or a y-axis, and a vertical line of travel or a z-axis, in accordance with a program inputted or loaded into the controller for performing a work function on one or more workpieces, positioned on the machine. Generally, the machine includes a base member 101, a bridge member 104, a tool head support assembly 105, and a tool head assembly 106. The base member is provided with a worktable 107, rigidly mounted on the base member 101, and a pair of track-ways 108 and 109, mounted on the sides of the base member and disposed parallel to the x-axis of the machine. Worktable 107 is adapted to support one or more individual workpieces, or one or more panels of sheet-material such as plywood and the like, for machining purposes. Such workpieces are adapted to be secured in position by a vacuum hold-down system.

The bridge member includes a transversely disposed beam section 110 spaced above and spanning the base member, and a pair of transversely spaced leg sections 111 and 112, straddling the sides of the base member and mounted on trackways 108, 109. The bridge member is displaced relative to the base member along the x-axis by means of a pair of gearboxes 113, one on either side of the base member, each driving a pinion gear, in operative engagement with a rack assembly 114, operatively interconnecting the side portions of the base member and inner side portions of leg sections 111 and 112.

Tool head support assembly 105 is supported on, and guided along a pair of transversely disposed, vertically spaced track-ways 115 and 116 provided on the front face of transverse beam section 110, and is displaceable along the y-axis by a rack and pinion drive assembly comprising a gearbox 118, driving a pinion gear, in operative engagement with a rack assembly 117, operatively interconnecting the bridge member and the tool head support assembly 105. In lieu of a rack and pinion arrangement, a drive screw and bail nut arrangement may be utilized as a driving means for the X and Y-axes. The tool-head assembly 106 is supported and displaceable along transversely spaced, vertically disposed track-ways mounted on support assembly 105, and is adapted to be displaced vertically by a drive screw assembly, operatively interconnecting the support assembly, and a tool head assembly. The tool-head assembly is further provided with a router bit 119, adapted to be displaced along the x, y and z-axes to provide a cutting pattern in a workpiece or material sheet supported on the work table.

Figure 2:
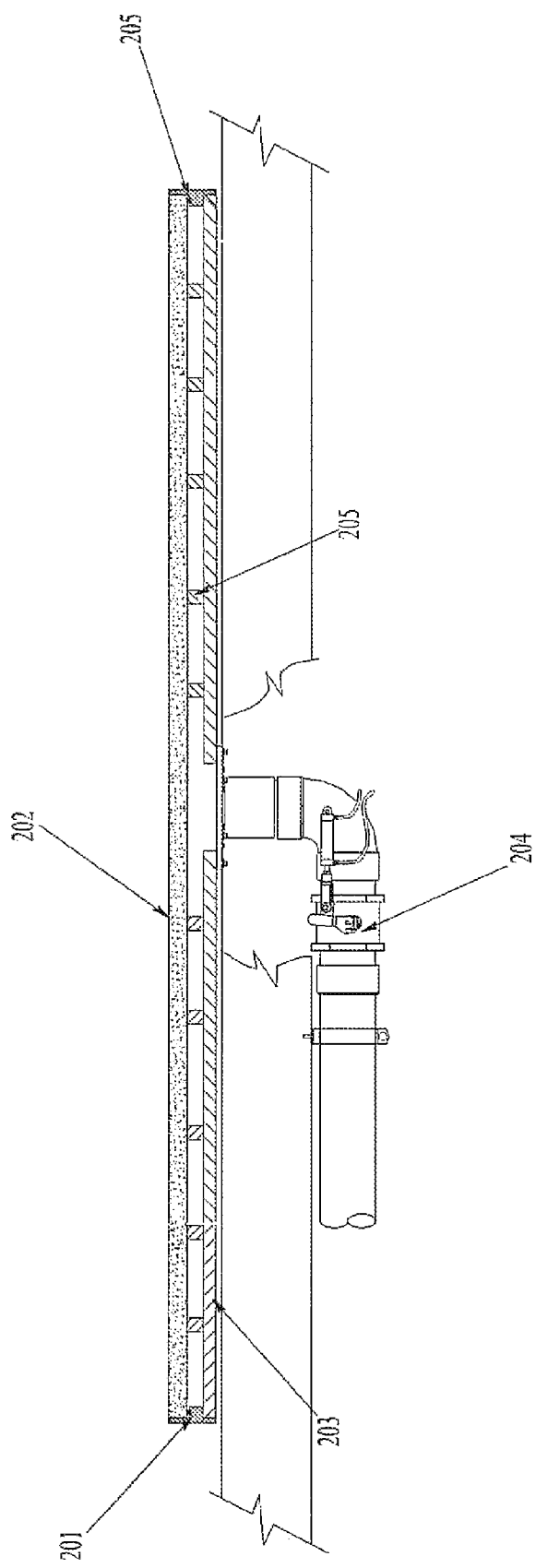
FIG. 2 is an enlarged cross-sectional view of a universal vacuum hold-down type worktable, utilized in a machine as shown in FIG. 1.

Referring to FIG. 2, A universal vacuum system comprises a solid worktable top 203, commonly referred to as a sub-top, which is fitted throughout with spacers 205 arraigned in a uniform pattern, along with a raised perimeter ledge 206, which is equal in height to the aforementioned spacers. A compliant foam-rubber perimeter-seal 201 is attached to the top of the perimeter ledge. A spoil board 202 comprising a sheet of special medium-density fiberboard (MDF) is placed on the sub-table. Such spoil board, onto which the workpiece is placed for processing, is a consumable item that requires periodic replacement. The spacers 205 and the perimeter ledge 206 provide support for the spoil board, while the seal reduces the loss of air at the perimeter, increasing the effectiveness of the system. This arrangement effectively creates a plenum chamber between the worktable members, capable of handling a large volume of air. A high-volume vacuum pump is attached to the machine by means of a large-diameter vacuum line, attached to a high-flow throttle valve 204, which is attached to the bottom of the sub-top 203. The throttle valve controls the flow of air drawn down through the spoil board 202, through the plenum, and out to the vacuum pump.

Because the spoil board is porous, air flows through it, creating a low-pressure area on top of the board, wherever a restriction exists. Any panel or workpiece placed upon the surface of this spoil board will be pulled tight, holding it in place on the surface. Since the entire area of the spoil board restricts airflow, the work-piece will be held regardless of where it is placed, without the need for seals. The pressure differential that exists in a universal hold-down system is relatively slight, due to the inherent leakage associated with the porous spoil board, as well as the lack of a workpiece perimeter-seal. Nonetheless, by drawing a large volume of air through the spoil board, the leakage is overcome sufficiently enough to develop an adequate pressure differential.

In a vacuum hold-down system, the surface adhesion factor of a given part is largely dependent upon the surface area exposed to vacuum. Because of this, a larger part can tolerate a worktable surface of a lesser quality, than that which can be tolerated by a smaller part. As the surface quality of the worktable deteriorates, due to excessive grooving, remedial measures must be initiated, in order to preserve the integrity of the part hold-down system. There are several ways to address this problem, among which are, replacement of the spoil board or, fly-cutting the existing spoil board.

Fly-cutting the existing board is the least-expensive method of remedying the problem of surface degradation, since in either case, the spoil board would require fly-cutting. Fly-cutting is a process that comprises skim-cutting the surface of the spoil board, with an end-cutting router bit, the purpose of which is to both level the spoil board surface, relative to the x-y plane, as well as to achieve a smooth surface on the board.

It is difficult to discern as to when the spoil board has reached a point at which surface degradation will adversely effect hold-down capability. The present invention addresses this problem by providing a software program that monitors the degradation of the spoil board during the machining process. The grooved areas are calculated in real-time with the execution of the workpiece program. The total value of the calculated area is continuously tabulated, and the value is simultaneously stored in a monitored table, embedded in the software. That quantity is referred to as the area-removed $(A_R)$ value; the overall surface quality of the worktable is proportional to this value.

Figure 3:
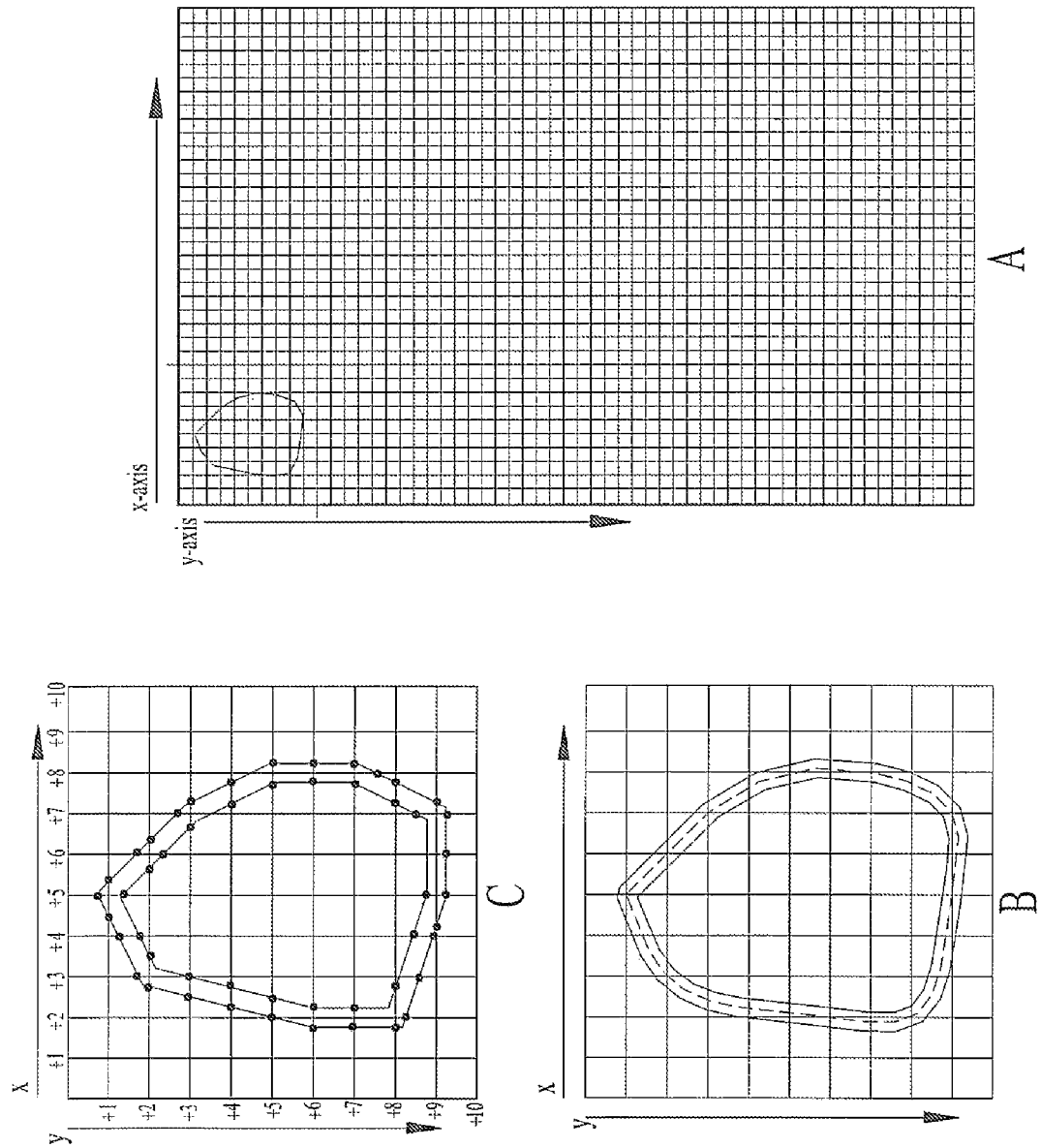
FIG. 3 is a cartesian-gridded representation of a CNC worktable surface.

In the machine control software, the location of the toolhead is continuously plotted in cartesian coordinate format within the control software, based on the movement of the machines various axes throughout the work envelope. In the present invention, the x-y location of the tool tip is plotted on the grid in small increments, in the order of 0.060 inches, more or less, as it moves throughout the work envelope. FIG. 3 best exemplifies this process. Referring to FIG. 3-A, there is illustrated, a gridded cartesian layout of a machine worktable. Given the limited resolution imposed by the drawing size, the grid is shown in approximately 1 inch by 1-inch format for clarity. In actuality, such a grid would be incremented in units in the order of approximately 0.060 inches.

Illustrated in the upper left-hand corner of the grid in FIG. 3-A is a random shape, representing a tool cut-path for one of multiple parts, which would be cut from a sheet of panel stock. FIG. 3-B is a larger representation of the aforementioned shape, showing the width of the cut path, along with the centerline of the cutter.

FIG. 3-C exemplifies the same tool path, along with plotted coordinate points. Both the inner and outer perimeter of the cut path are plotted, and the points are connected by straight lines. The area within the lines is computed as it is plotted, and this becomes the $(A_R)$ value. The $(A_R)$ value changes continuously as the cut-path progresses through the program. The aggregate sum of the cut path (expressed as $A_R$) is a representation of the worktable surface quality. The $(A_R)$ value is continuously updated in the control.

Because the area of a given part is an important factor in determining its vacuum hold-down capability, this parameter is calculated for each part in the cutting sequence as a step in the process of building the part-cutting program, prior to it being loaded into the machine. The part is assigned a value, based on its surface area. The machine control monitors this value for each part and, if based on this value, insufficient surface area is detected, a provision is made for leaving a thin layer of material in the bottom of the cut path, to prevent the part from being moved or separated from the worktable due to cutting forces.

A CNC program may be a simple program comprising only one cutting cycle and one material sheet; or a given CNC program may require multiple nested cutting sequences, each requiring a new material sheet from which to cut the parts. A nested cutting sequence, in the present context, is a separate nested sub-program within a larger program. In either case, the present invention functions in the same manner.

Figure 4:
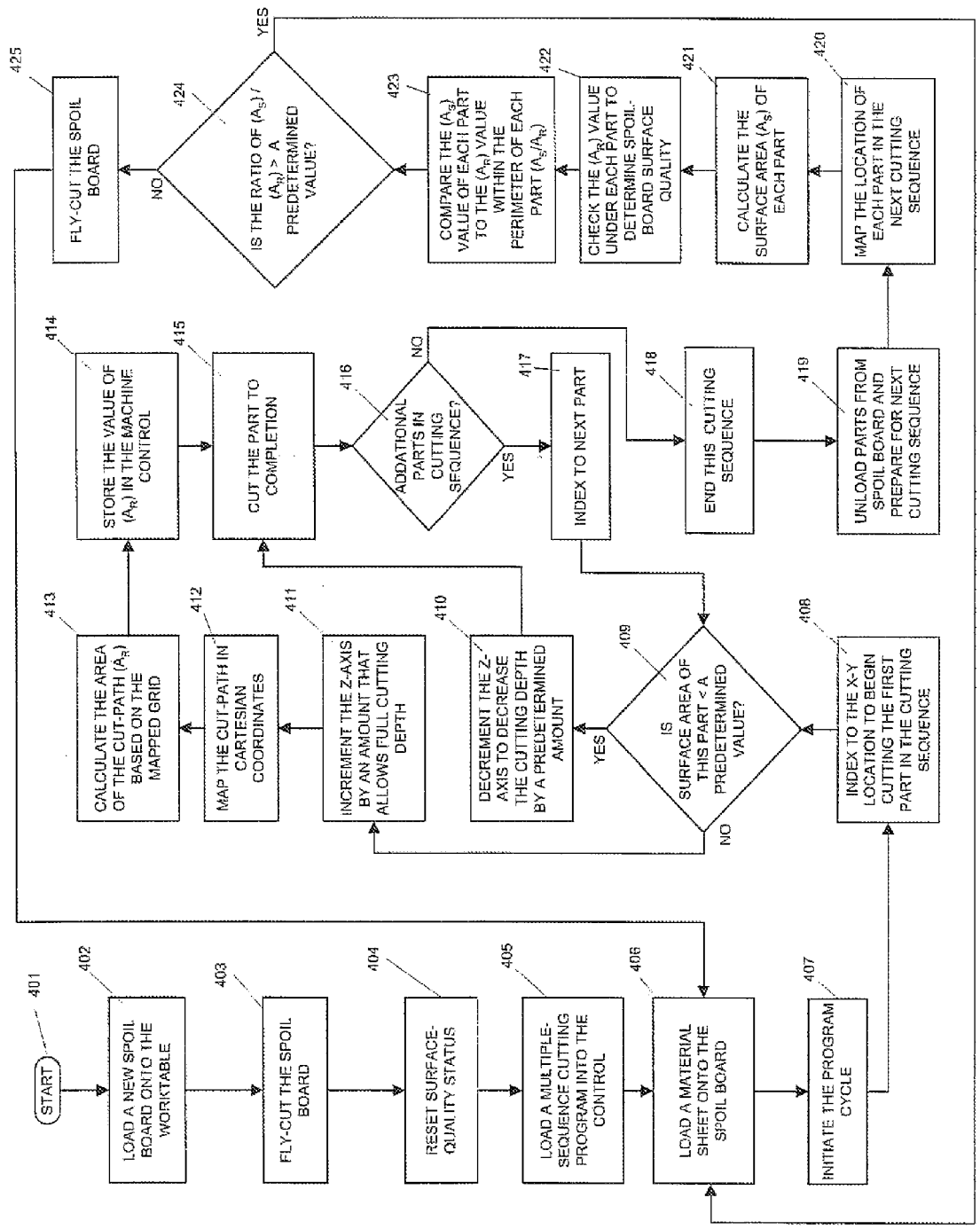
FIG. 4 is a flowchart illustrating an algorithm for executing a CNC cutting program, and providing quantitative data for determining the quality of the worktable surface.

FIG. 4 exemplifies the flow process of a CNC program requiring multiple nested cutting sequences to complete all of the parts within the overall program. Each cutting-sequence within a program comprises multiple parts nested and arranged in an optimal pattern to fit within the perimeter of a separate material sheet, in such a manner as to maximize the utilization of the material sheet, leaving minimal waste material. Referring to FIG. 4, a new spoil board is loaded onto the worktable of a CNC machine 402. The operator, as a standard practice, initiates the fly-cutting program to assure surface flatness of the new spoil board 403. Upon completion of the fly-cutting cycle, the surface quality status in the control resets to the default value of a new, un-grooved spoil board 404. A workpiece processing program is loaded into the machine control 405. A new material sheet is loaded onto the spoil board surface 406. The program cut-cycle begins 407. The control then commands the axes to move into position and begin cutting the first part in the cutting sequence 408. Prior to initiating the cutting process, the control checks the pre-calculated area of the part in process, and determines if the part has sufficient surface area to effect adequate hold-down force from the vacuum system 409. If the part is determined to have insufficient surface area for adequate hold-down, the z-axis is decremented upward in a sufficient amount to cause a slight thickness of material to be left in the bottom of the cutting path, thus preventing total separation from the material sheet, and preventing the part from moving as a result of cutting forces 410. If the part has sufficient surface area, the z-axis is incremented downward to allow full cutting depth, and proceeds to cut the part, cutting slightly into the spoil board to assure the complete severing of the part from the material sheet 411. The control maps the worktable in a cartesian grid pattern 412. The control calculates and totalizes the area of the cut-paths in unison with program execution 413. The value of the total cut-path area, expressed as the area removed $(A_R)$ is stored in the machine control, in accordance with the progression of the cutting operation 414. The part is cut to completion 415. The control checks to see if additional parts within the current cutting sequence require processing 416, if there are additional parts in the cutting sequence, the machine indexes to the next part and another cut-cycle is initiated 417. If there are no further parts in the cutting sequence, the control terminates the sequence and sends the machine home 418. The parts are unloaded from the worktable in preparation for the next cutting sequence 419.

The x-y location of each part in the next cutting sequence is mapped by the control software 420. The surface area of each part in the next cutting sequence is calculated 421. The previously calculated $A_R$ value is checked 422. The surface area (As value) of each part in the cut-sequence is compared to the $A_R$ value within the perimeter of each part 423. If the ratio of $A_S/A_R$ is equal to or greater than a predetermined value, a new material sheet is loaded onto the spoil board, and the next cut sequence can begin 406. If the ratio of $A_S/A_R$ is less than a predetermined value, the operator is directed to fly-cut the spoil board to restore its surface quality. Upon completion of the fly-cutting operation, the operator may load a new material sheet is onto the spoil board, and begin the next cut sequence 406.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. A method of forming at least one part of a selected profile from a workpiece mountable on a porous spoil board disposed on the worktable of a CNC router machine having means for applying a negative pressure on the underside of said workpiece mounted on said spoil board, providing a pressure differential across said mounted workpiece, and a cutting tool displaceable along x, y and z axes to form said selected profile, comprising:
   programming the controller of said machine to generate a cutting pattern to provide said part profile, compute the area of said part, map the cut path of said part, compote and store the value of said cut path area, compare the computed area value of said part with a predetermined area value and position said cutting tool along the z-axis to provide less than a through cut of said workpiece where said computed area value is less than said predetermined area value and provide a through cut where said computed area value exceeds said predetermined area value;
   mounting said workpiece on said worktable;
   actuating said negative pressure applying means; and
   operating said machine to execute said program.

2. A method according to claim 1 wherein said workpiece comprises a panel.

3. A method according to claim 1 including finishing the through cutting of parts provided with non-through cuts by means of other cutting means.

4. A method according to claim 1 including fly-cutting said spoil board upon determination of said cut path area value exceeding a second predetermined area value.

5. A method according to claim 1 including replacing said spoil board upon determination of said cut path area value exceeding a second predetermined value.

6. A method according to claim 1 including fly-cutting said spoil board upon determination of said cut path area exceeding a second predetermined area value and replacing said spoil board upon determination of said cut path area exceeding a third predetermined area value.

7. A method according to claim 1 including fly-cutting said spoil board prior to executing said program to form said part, and correspondingly sitting said cut path area value.

8. A method according to claim 1 including replacing said spoil board prior to executing said program to form said part, and correspondingly sitting said cut path area value.

9. A method according to claim 1 including programming the controller of said machine to nest at least two parts to be formed of said workpiece to maximize the yield of said parts therefrom, generate a cutting pattern to provide the required part profiles, compute the area of each of said parts, compare the area value of each of said parts with said predetermined area value and position said cutting tool along the z-axis to provide less than a through cut of said workpiece where said computed area value is less than said predetermined area value and provide for a through cut where said computed area value exceeds said predetermined area valve.

10. A method according to claim 9 wherein said workpiece comprises a panel.

11. A method according to claim 9 including finishing the through cutting of parts provided with non-through cuts by means of other cutting means.

12. A method according to claim 9 including further programming said controller to map the cut path of said parts, and compute and store the value of said cut path area.

13. A method according to claim 12 including fly-cutting said spoil board upon determination of said cut path value exceeding a second predetermined area.

14. A method according to claim 12 including replacing said spoil board upon determination of said cut path area value exceeding a second predetermined area values.

15. A method according to claim 12 including fly-cutting said spoil board upon determination of said cut path area exceeding a second predetermined area value and replacing said spoil board upon determination of said cut path area exceeding a third predetermined area value.

16. A method of forming parts of selected profiles from workpieces mountable on a porous spoil board disposed on the worktable of a CNC router machine having means for applying a negative pressure on the underside of one of said workpieces mounted on a spoil board disposed on said worktable, providing a pressure differential across said mounted workpiece, and a cutting tool displaceable along x, y and z axes to form said selected profiles, comprising:
   loading a multiple sequence cutting program into the control of said machine wherein a first cutting sequence consists of
      comparing the surface area value of each part with a predetermined area value;
      adjusting the cutting depth of the cutting tool of the machine to provide less than a through cut where said surface area value is less than said predetermined area value, and a through cut where said surface area value is equal or greater than said predetermined area value;
      mapping the cut path of said first cutting sequence;
      calculating the area of said cut path; and
      storing the value of the calculated cut path area,
   and wherein a second cutting sequence consists of:
      mapping the location of each part in said second cutting sequence;
      calculating the surface area of each part in said second cutting sequence; and
      calculating the ratio of the value of the calculated surface areas of the parts in said second cutting sequence to the stored value of the calculated out,
   loading a workpiece on said worktable;
   activating said negative pressure applying means;
   operating said machine to execute said program;
   unloading said workpiece including cut parts upon execution of said program; and one of fly-cutting and replacing said spoil board where said ratio is not greater than a predetermined value.

* * * * *

UNITED STATES PATENT AND TRADEMARK OFFICE
CERTIFICATE OF CORRECTION

| | | |
|---|---|---|
| PATENT NO. | : 8,641,337 B2 | Page 1 of 1 |
| APPLICATION NO. | : 12/880459 | |
| DATED | : February 4, 2014 | |
| INVENTOR(S) | : Epplin et al. | |

It is certified that error appears in the above-identified patent and that said Letters Patent is hereby corrected as shown below:

In the Claims

Column 5, Claim 1, line 34 – please replace the word "compote" with the proper word "compute". The line should read "...area of said part, map, the cut path of said part, compute...".

Signed and Sealed this
Nineteenth Day of August, 2014

Michelle K. Lee
*Deputy Director of the United States Patent and Trademark Office*